Nov. 12, 1946.  B. FARLEY  2,410,969
DELVING MACHINE
Filed Sept. 19, 1944
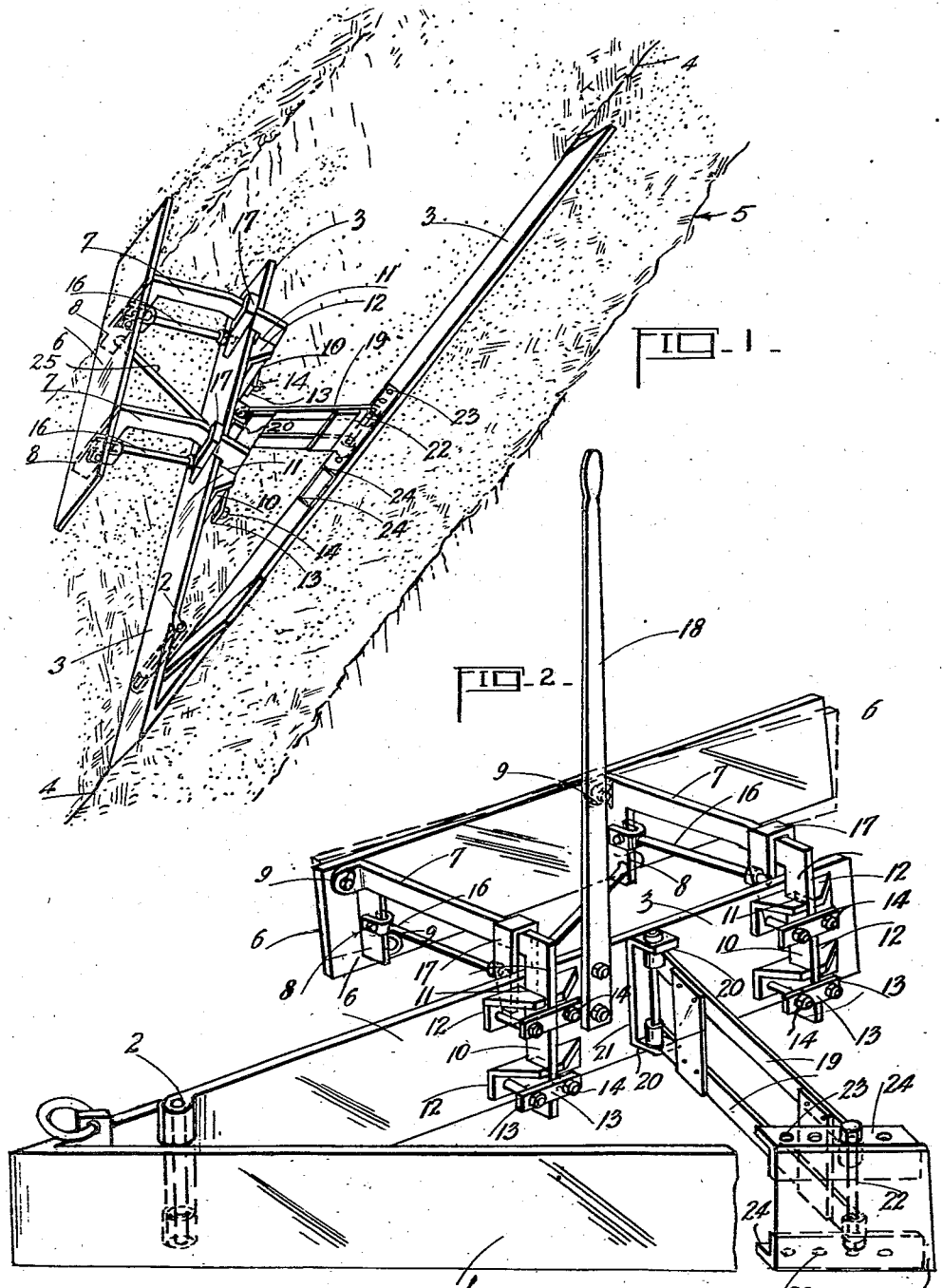
Inventor
Brian Farley
By his Attorney
H. H. Rayward Patented Nov. 12, 1946

2,410,969

UNITED STATES PATENT OFFICE 2,410,969

DELVING MACHINE

Brian Farley, Coolabah, Yenda, New South Wales, Australia

Application September 19, 1944, Serial No. 554,819

2 Claims. (Cl. 37—98)

This invention relates to excavating machines known as "delvers" and used to form ditches and the like, and also to clear existing ditches and channels used for irrigation and like purposes.

The object of my invention is the provision of means whereby a higher and steeper bank to the channel is produced without materially increasing the tractive power required in operating the machine.

Delvers at present in general use, comprise a beam having a share blade at its leading end and having hinged upon it a wing whereby soil is raised to form the bank of the channel.

The primary feature of my invention consists in the employment of a supplementary, relatively short wing, approximately parallel with the usual wing referred to and whereby the bank of soil already produced by the usual wing, is farther lifted to produce a higher bank than could be obtained by the usual wing alone, unless such wing were extended to such length that the weight of soil carried upon it would make the machine inconvenient to use or impracticable.

An embodiment of my invention is illustrated in the accompanying drawing wherein:

Fig. 1 is a perspective diagrammatic view showing the machine in use and

Fig. 2, a perspective view illustrating the attachment of the supplementary wing and its associated parts.

The main beam 1 is, as usual, connected by a hinge joint 2 with a wing 3, and is guided by a furrow 4 produced by a plough, which furrow is at the bottom of the channel to be produced by the delver.

When the machine is in use the beam and the wing are at an angle to the vertical, the wall of the furrow forming an inclined abutment 5 against which the beam bears.

The following means is employed for adjustably securing the supplementary wing to the main wing.

Two similar brackets 7 have a limb 8 which is fixed to wing 6 by bolts passed through ears 9.

A limb 10 of the bracket 7 passes through slits 11 in each of the angle pieces 12 which are welded to the wing.

The limb 10 is held in the slits 11 by cross plates 13 fixed to the wing by bolts 14 passing through the angle pieces 12 and wing 3.

By this arrangement the supplementary wing can be removed when desired and fixed upon the opposite side of the wing 3.

A rod 16 is fixed at one end to the limb 8, and its other end being a screw, is threaded and passes through the lower end of a runner 17 sleeved upon the member brackets 7; the rod 16 has a nut upon it which, being screwed up, engages the runner 17 and clamps the runner against the face of wing 3.

The supplementary wing may, as shown in dotted lines, Fig. 2, be raised at either end by releasing the bolts which work in slots in the ears 9.

A handle 18, fixed to the main wing, may be used in turning the machine for transport and the like purposes.

To adjust the angle between the wing 3 and the beam 1, stay bars 19 are pivoted to lugs 20 on a bracket 21 welded to wing 3, and at their other end are pivoted on a vertical bolt 22 which is passed through one or other of holes 23 in angle bars 24 welded to the beam 1.

A diagonal brace rod 25 is secured at one end to the limb 8, and at its opposite end to the runner 17 of lower bracket 7.

I claim:

1. In an improved delver for forming ditches and channels the combination of a main beam guided by a furrow and a wing hinged thereto, with a supplementary wing for producing a high steep bank to the channel, said supplementary wing being spaced laterally outwardly from the hinged wing and being secured to a pair of brackets each having a limb with a lug, a bolt passing through the lug to secure the supplementary wing to the bracket, said brackets each also having a second limb and slotted angle pieces secured to the hinged wing engaged by the second limbs so that the supplementary wing is supported from the hinged wing.

2. In an improved delver for forming ditches and channels the combination of a main beam guided by a furrow and a wing hinged thereto, with a supplementary wing for producing a high steep bank to the channel, said supplementary wing being spaced laterally outwardly from the hinged wing and being secured to a pair of brackets each having a limb with a lug, a bolt passing through the lug to secure the supplementary wing to the bracket, said brackets each also having a second limb and slotted angle pieces secured to the hinged wing engaged by the second limbs so that the supplementary wing is supported from the hinged wing, the second limbs being held in the slotted angle pieces by plates bolted thereto, a runner mounted upon each bracket and tension rods secured between the respective limbs and the lower end of the said respective runners.

BRIAN FARLEY.